United States Patent
Pesta et al.

[11] Patent Number: 6,161,890
[45] Date of Patent: Dec. 19, 2000

[54] SEAT RISER CINCH MECHANISM

[75] Inventors: Christopher J. Pesta, Sterling Heights; Murali M. Govindarajalu, Southfield; Matthew E. Dukatz, Bloomfield Hills; Troy M. Cornell, Plymouth, all of Mich.

[73] Assignee: DaimlerChrysler, Auburn Hills, Mich.

[21] Appl. No.: 09/318,418

[22] Filed: May 25, 1999

[51] Int. Cl.⁷ .................................................. B60N 2/02
[52] U.S. Cl. ................................. 296/65.01; 296/65.03; 248/503.1; 297/344.1
[58] Field of Search ............................ 296/65.03, 65.01, 296/63; 248/503.1, 424; 297/344.1, 236

[56] References Cited

U.S. PATENT DOCUMENTS

| | | |
|---|---|---|
| 3,880,464 | 4/1975 | Murphy et al. . |
| 4,759,580 | 7/1988 | Berklich, Jr. et al. ............... 296/65 |
| 4,865,377 | 9/1989 | Musser et al. . |
| 5,238,285 | 8/1993 | Holdampf et al. ............... 296/65.1 |
| 5,372,398 | 12/1994 | Aneiros et al. . |
| 5,482,345 | 1/1996 | Bolsworth et al. . |
| 5,547,242 | 8/1996 | Dukatz et al. . |
| 5,626,391 | 5/1997 | Miller et al. ............... 296/65.1 |
| 5,671,965 | 9/1997 | O'Connor ............... 296/65.1 |
| 5,697,662 | 12/1997 | Leftwich ............... 296/63 |
| 5,765,894 | 6/1998 | Okazaki et al. ............... 296/65.1 |
| 5,775,763 | 7/1998 | Glinter et al. ............... 296/65.1 |
| 5,803,549 | 9/1998 | Boswaorth et al. ............... 296/65.03 |
| 5,951,086 | 9/1999 | Hoshino et al. ............... 296/65.03 |
| 6,036,252 | 3/2000 | Hecksel et al. ............... 296/65.03 |
| 6,056,257 | 5/2000 | Jaisle et al. ............... 248/424 |
| 6,056,346 | 5/2000 | Smuk ............... 296/65.03 |

*Primary Examiner*—Joseph D. Pape
*Assistant Examiner*—Kiran Patel
*Attorney, Agent, or Firm*—Lawrence J. Shurupoff

[57] ABSTRACT

A seat riser for use with a motor vehicle of the type having longitudinally spaced and laterally extending front and rear floor mounted strikers to removably mount a seat in the vehicle has front and rear latches connected to a frame by pivot pins. Each latch has a hook. The front latch pivots to a latching position in which its hook engages an underside of the front striker. The rear latch pivots to a latching position in which its hook engages an underside of the rear striker. The latches are pivoted to and from their latching positions by a handle connected to one of the latches, with a link interconnecting the latches. The relationship of the latches to each other and to the link is such that one of the latches engages and disengages its striker before the other, thereby reducing the maximum force needed to pivot the latches to and from their latching positions.

5 Claims, 9 Drawing Sheets

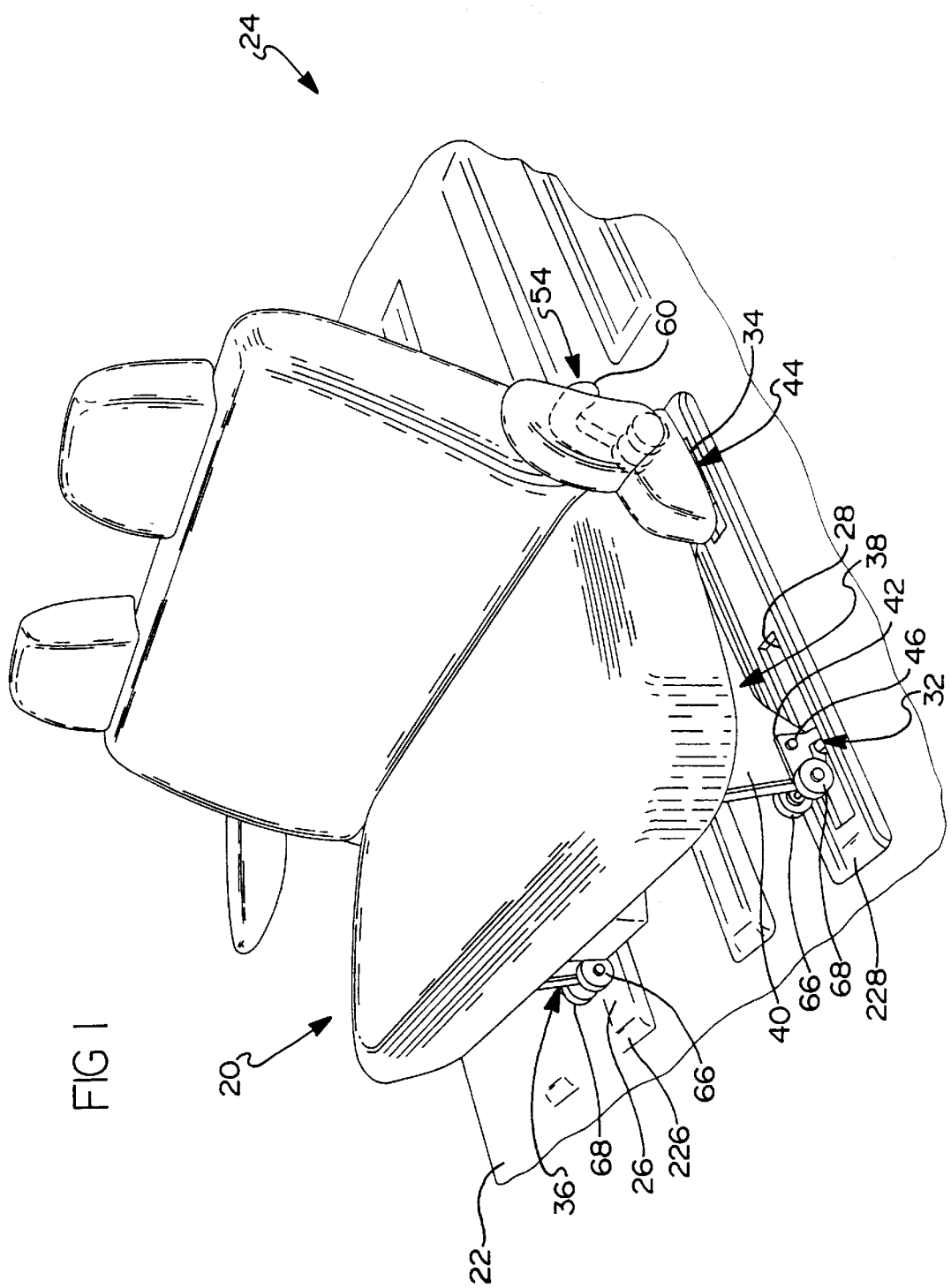

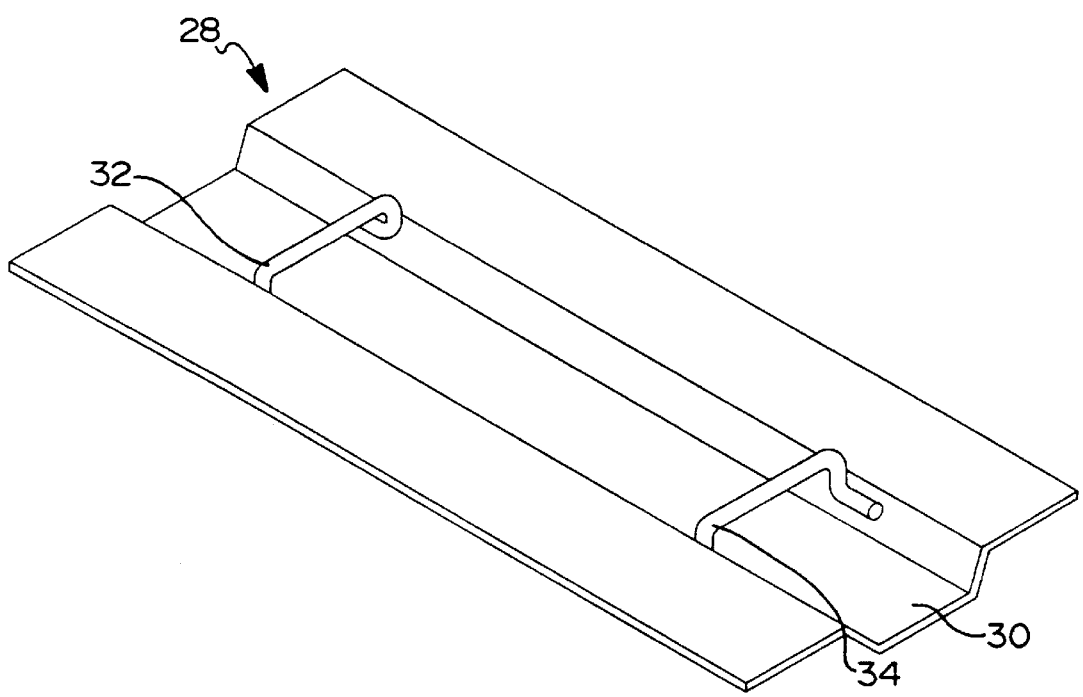

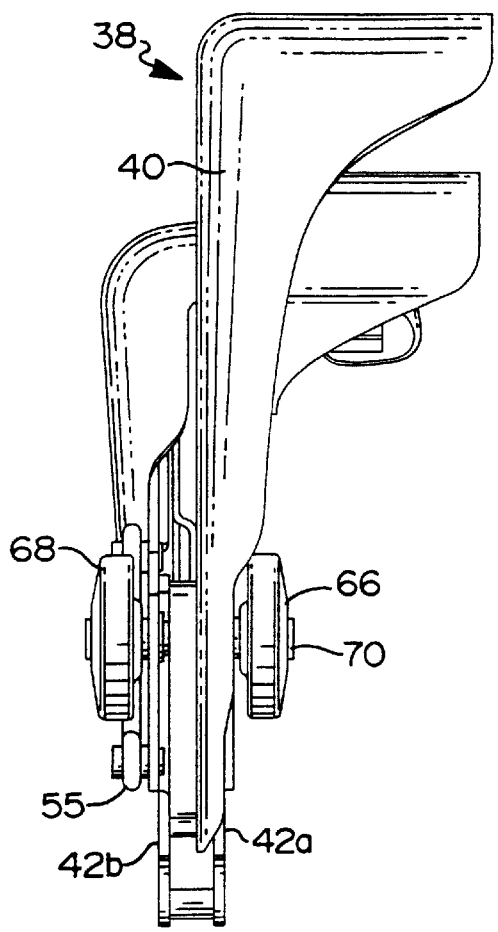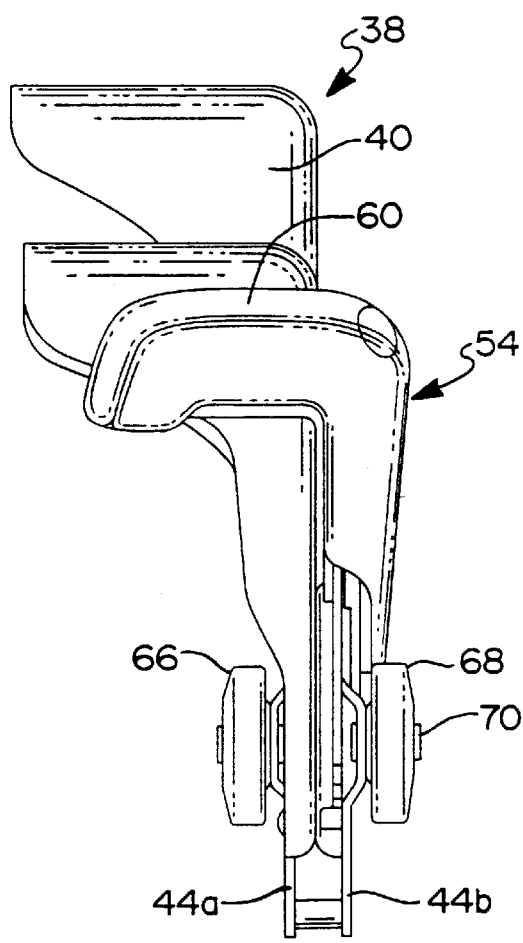

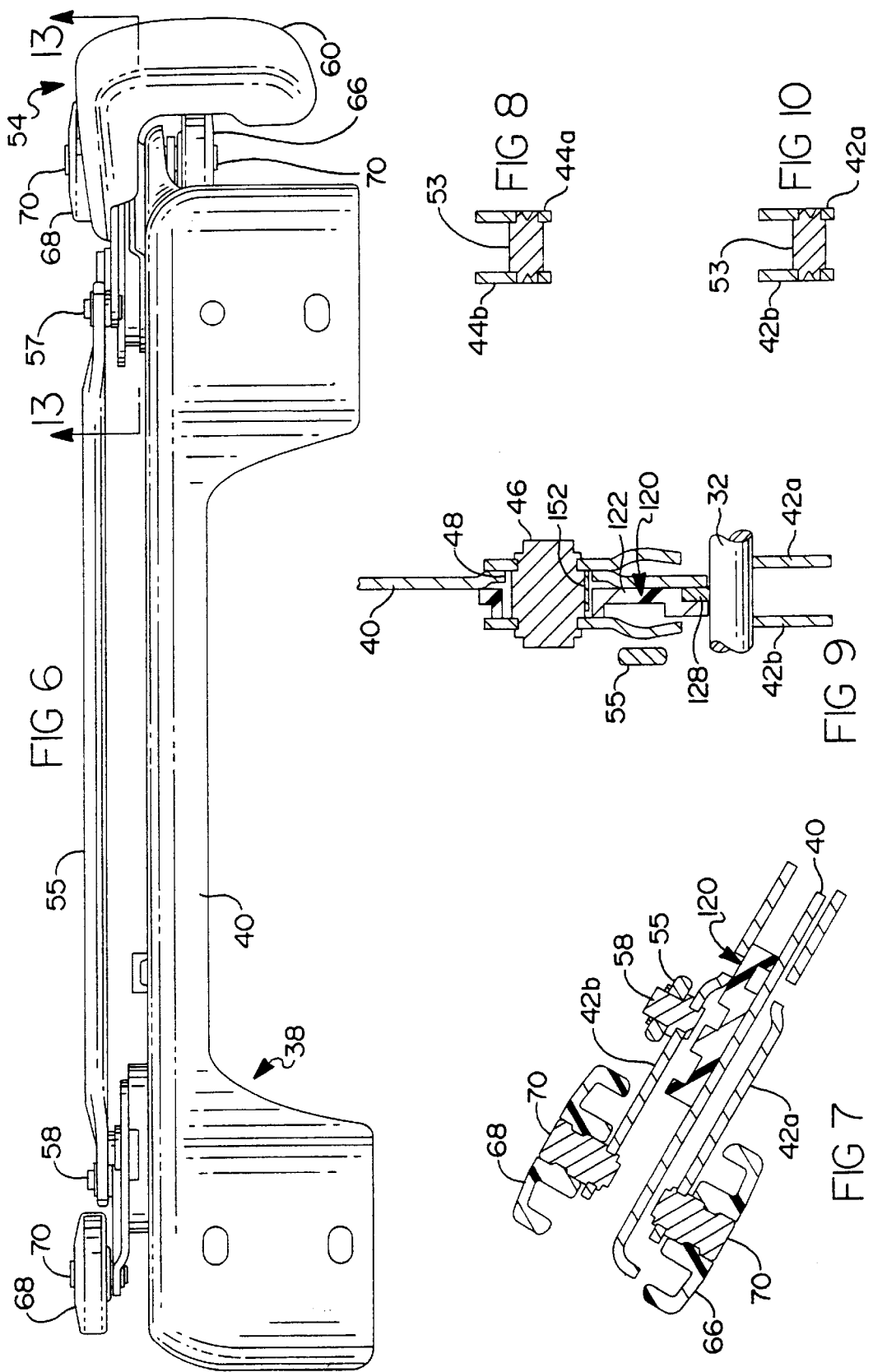

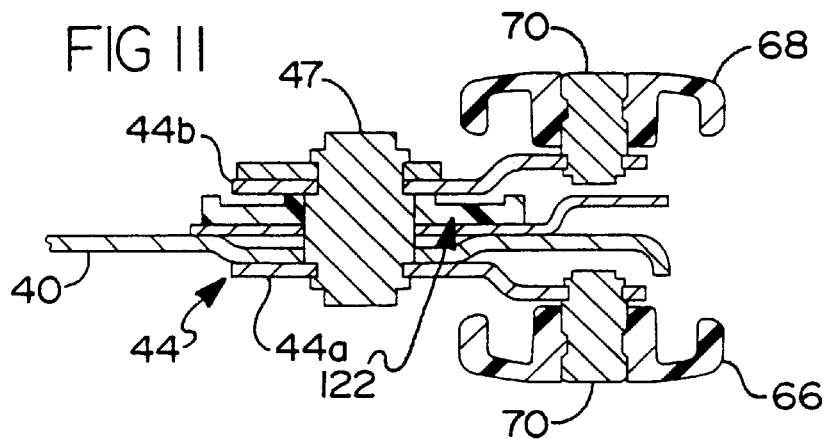
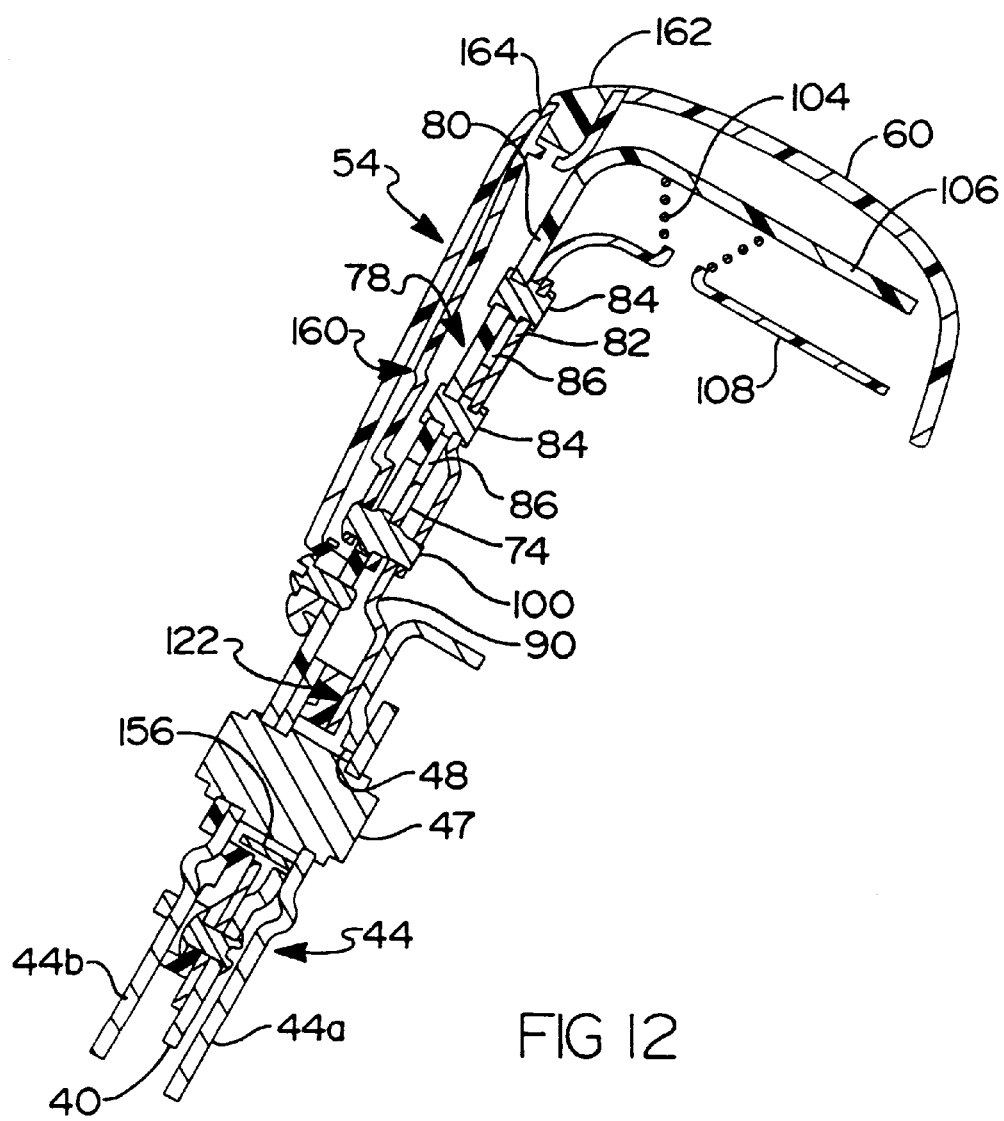

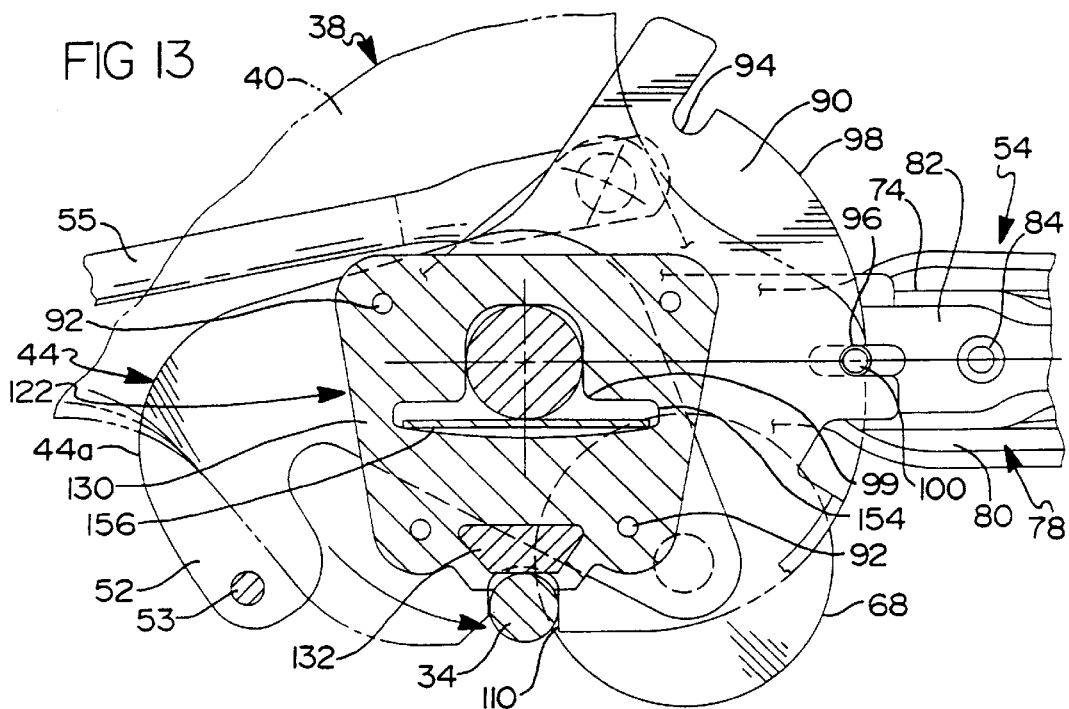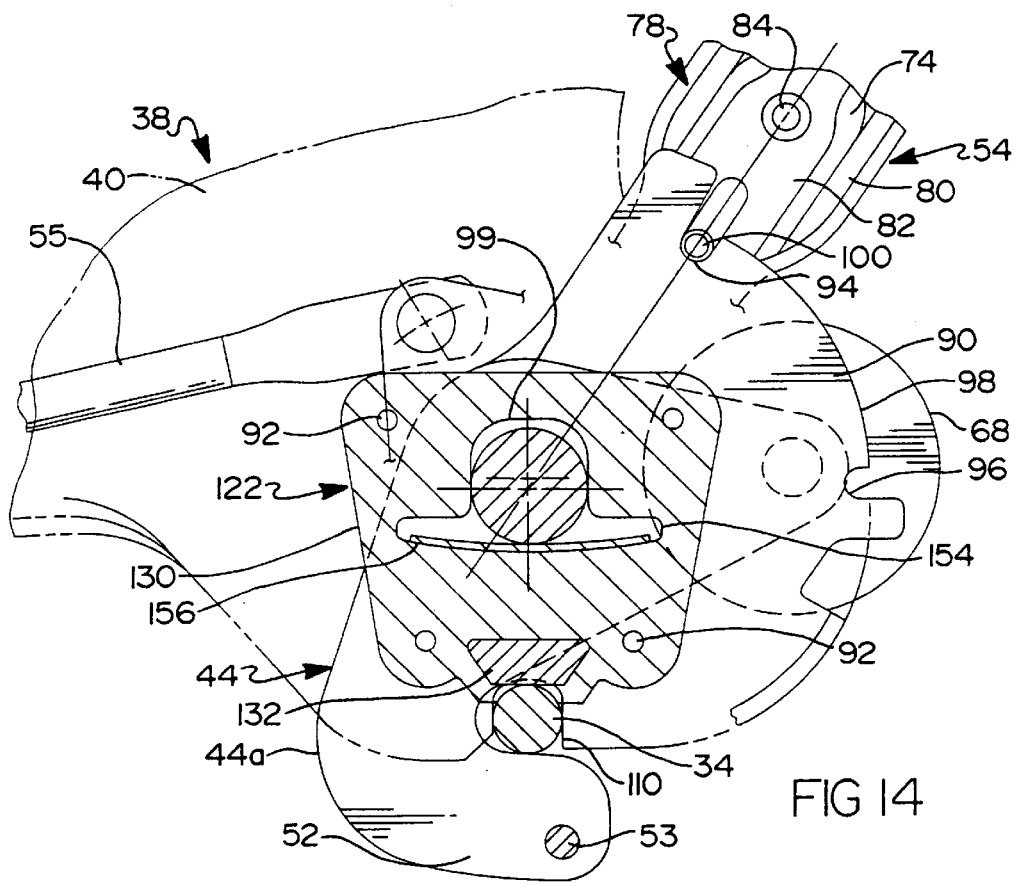

SEAT RISER CINCH MECHANISM

This invention relates generally to a riser for use in removably mounting a seat in a motor vehicle, and more particularly to a cinch mechanism for the seat riser.

BACKGROUND AND SUMMARY OF THE INVENTION

In many types of motor vehicles, including vehicles of the utility or van type, it is common practice to provide rear passenger seats that can be readily removed to increase the cargo carrying capacity of the vehicle. Ideally, these seats should be capable of being readily and easily locked in place in the vehicle and just as easily removed with a simple, low effort operation on the part of the operator. In addition, the seat when installed should be firmly locked in place without producing any rattles or squeaks and without any shifting whatsoever.

In accordance with the present invention, the seat riser is used with a motor vehicle of the type having longitudinally spaced and laterally extending front and rear floor mounted strikers. The seat riser includes front and rear pivoting latches, each having a hook adapted to engage under a striker when pivoted to a latching position. Each latch carries a cinch plate which is adapted to bear on an upper side of the associated striker when the latch is pivoted to its latching position to cooperate with the hook in stabilizing and anchoring the riser. Preferably, each cinch plate includes a gripper element which is adapted to frictionally engage the associated striker.

Further in accordance with the invention, both front and rear latches are pivoted to the latching position by a single handle connected to one of the latches. A link interconnects the latches. The relationship of the latches to one another and to the interconnecting link is such that when the latches are pivoted to their latching positions, one of the latches engages the associated striker before the other, and when the latches are pivoted away from their latching positions, one of the latches disengages the associated striker before the other, thereby reducing the maximum force necessary to pivot the latches to and from their latching positions.

One object of this invention is to provide a seat riser and cinch mechanism having the foregoing features and capabilities.

Another object is to provide a seat riser cinch mechanism which is composed of a relatively few simple parts, is rugged and durable in use, and is capable of being easily operated with minimum effort.

These and other objects, features and advantages of the invention will become more apparent as the following description proceeds, especially when considered with the accompanying drawings.

BRIEF DESCRIPTION OF THE DRAWINGS

FIG. 1 is a perspective view of a rear passenger seat of an automotive vehicle secured in place by two seat risers constructed in accordance with the invention.

FIG. 1A is a perspective view showing two strikers mounted on a rail in the floor of the vehicle.

FIG. 4 is a front end view of the riser.

FIG. 5 is a rear end view of the riser.

FIG. 6 is a top view of the riser.

FIG. 7 is a sectional view taken on the line 7—7 in FIG. 2.

FIG. 8 is a sectional view taken on the line 8—8 in FIG. 2.

FIG. 9 is a sectional view taken on the line 9—9 in FIG. 2.

FIG. 10 is a sectional view taken on the line 10—10 in FIG. 2.

FIG. 11 is a sectional view taken on the line 11—11 in FIG. 2.

FIG. 12 is a sectional view taken on the line 12—12 in FIG. 2.

FIG. 13 is a sectional view taken on the line 13—13 in FIG. 6, showing a latch in retracted position.

FIG. 14 is a view similar to FIG. 13 but shows the latch in its latching position.

DETAILED DESCRIPTION OF THE PREFERRED EMBODIMENTS

Figure 2:
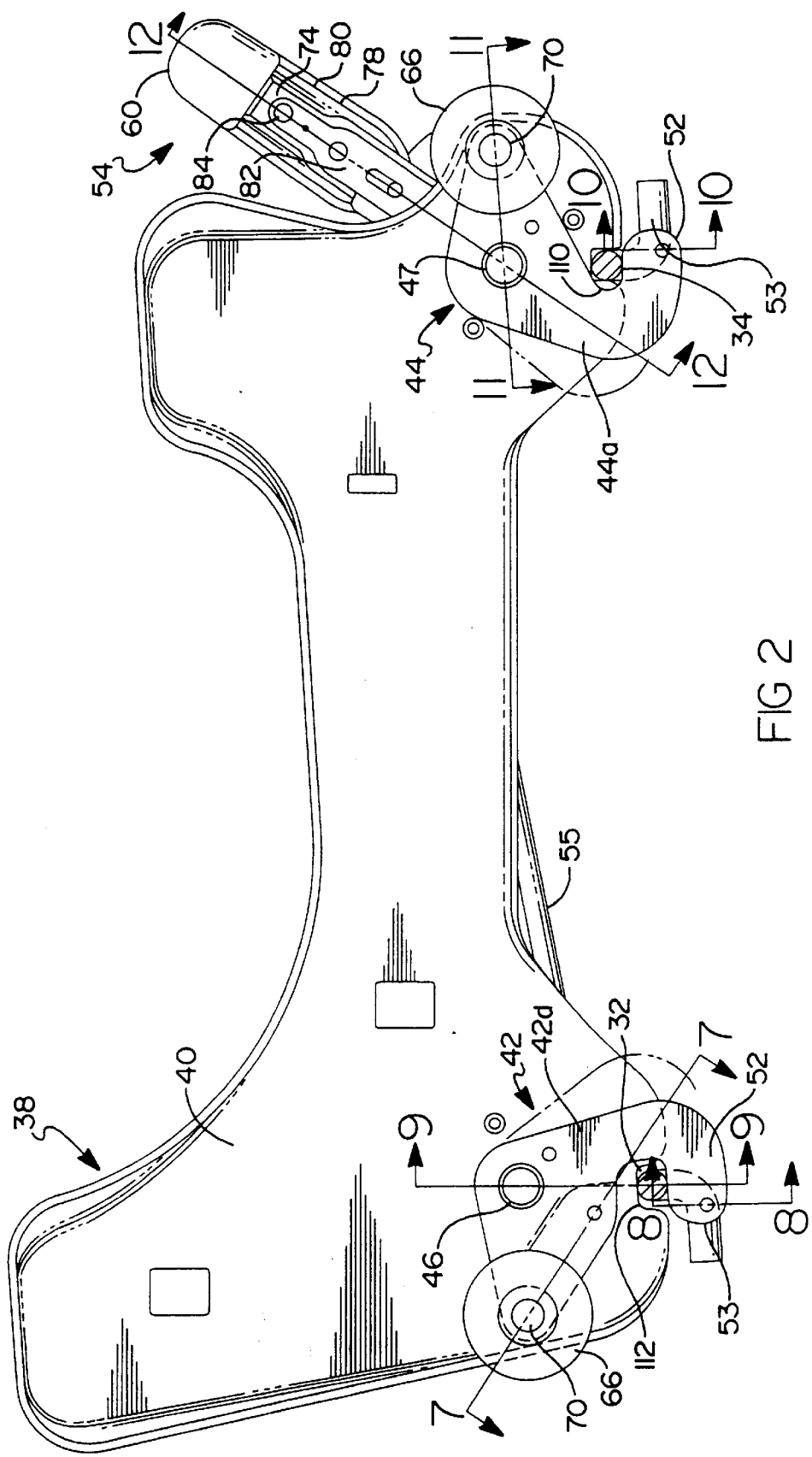
FIG. 2 is a side view of one of the seat risers, having front and rear latches shown in their latching positions.

Referring now more particularly to the drawings, and especially FIGS. 1 and 1A, a rear passenger seat 20 is shown releasably mounted on a horizontal deck or floor 22 of a motor vehicle 24. The floor has laterally spaced apart parallel rails 26 and 28 which extend longitudinally of the vehicle beneath opposite sides of the seat. Each rail has a central channel 30 extending lengthwise thereof. Escutcheons 226 and 228 overlie the rails 26 and 28. Longitudinally spaced and laterally extending front and rear strikers 32 and 34 extend across each channel above the bottom of the channel. The strikers are in the form of strong, rigid wire elements. Risers 36 and 38 are mounted on opposite sides of the seat above the rails. The risers are spaced apart the same distance as the rails and cooperate with the strikers in releasably latching the seat as will become more apparent from the following description.

Figure 15:
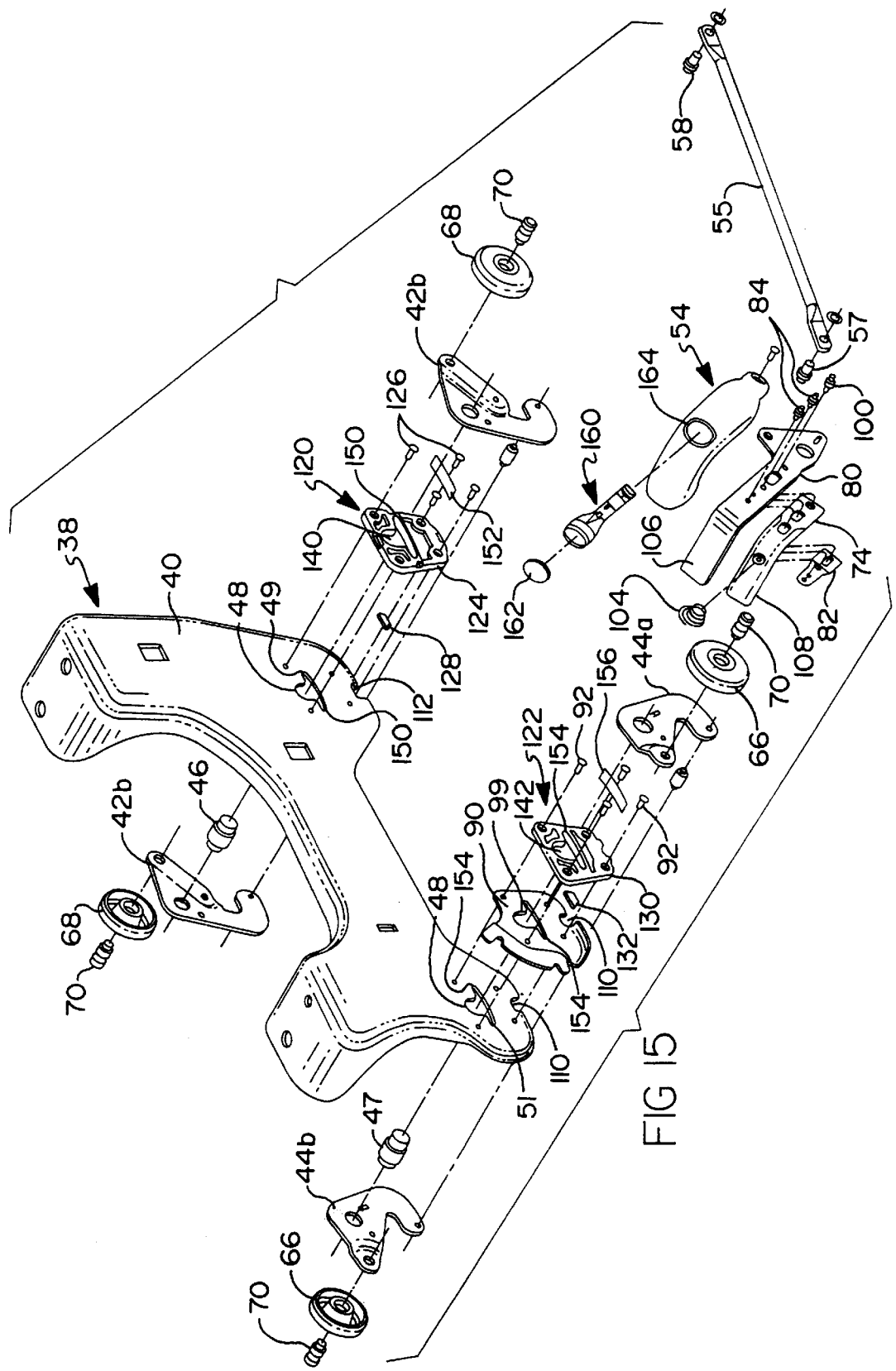
FIG. 15 is an exploded view of the riser to better illustrate its component parts.

The risers 36 and 38 are mirror images of one another and therefore a description of one will be sufficient for both. It is also possible to make the risers identical with another one so that they are interchangeable. The riser 38 includes a frame 40 rigidly secured to the seat, and front and rear latches 42 and 44. The frame 40 is upright or vertical and extends longitudinally of the vehicle. The front latch 42 is composed of two substantially identical latch plates 42a and 42b (FIG. 7) on opposite sides of the frame 40 and pivoted to the frame by a pivot pin 46 (FIG. 9). The rear latch 44 is composed of two substantially identical latch plates 44a and 44b (FIG. 11) on opposite sides of the frame 40 and pivoted to the frame by a pivot pin 47. The pivot pins 46 and 47 extend through the upper semi-circular portions 48 of holes 49 and 51 in the frame (FIG. 15). The semi-circular portions 48 are slightly larger than the pivot pins to loosely receive them. The holes 49 and 51 have the hat-shaped configuration shown for reasons which will become apparent. The latch plates of each of the latches 42, 44 are formed with extensions which cooperate in providing an L-shaped hook 52 (FIG. 13). A transverse pin 53 connects the hook-forming extensions of each latch.

Figure 3:
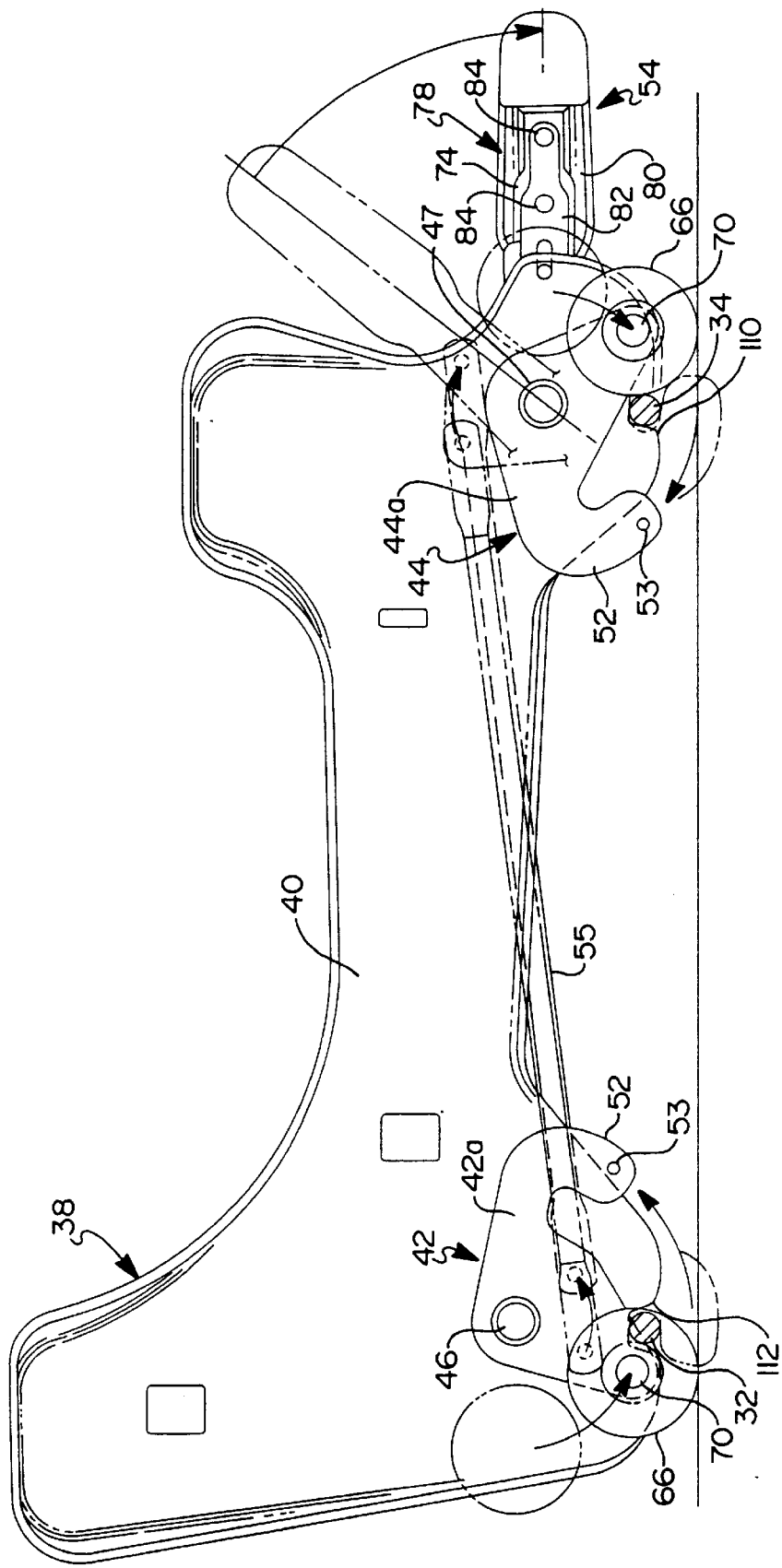
FIG. 3 is a view similar to FIG. 2, showing the latches retracted in solid lines, and in latching position in broken lines.

A handle 54 is provided for pivoting the rear latch 44 between a latching position shown in FIG. 2 and a retracted position shown in FIG. 3. An elongated link 55 is pivoted at one end by a fastener 57 to one of the latch plates of the rear latch 44 and is pivoted at the opposite end by fastener 58 to one of the latch plates of the front latch 42 so that both the front and rear latches 42, 44 are pivoted by operation of the one handle, although not exactly in unison. The relationship of the latches 42 and 44 to one another and to the link 55 is such that when the latches are pivoted to their latching position, one of the latches, in this case the rear latch, engages the associated striker slightly before the other, and when the latches are pivoted away from their latching positions, one of the latches, in this case the rear latch, disengages the associated striker slightly before the other. FIG. 2 shows in broken lines the position of the front latch 42 at the instant the rear latch 44 is initially engaged with the rear striker 34 during movement of the latches to the latching position. FIG. 2 also shows in broken lines the position of the rear latch 44 as it retracts prior to the retraction of the front latch during movement of the latches away from the latching position. This staggered or sequential latching is accomplished by selecting the points of interconnection of the link 55 with the front and rear latch plates such that the hook 52 on the rear latch plate contacts the rear striker 34 before the link 55 drives the front latch plate and its hook 52 into engagement with the front striker 32. Accordingly, the maximum force needed to pivot the latches to or from their latching positions is reduced. This significantly facilitates use of the latches. In the latching position of the latches, their hooks 52 engage the underside of the respective strikers 32 and 34 to lock the riser to the strikers.

The handle 54 extends radially outwardly from the pivot pin 47 for the rear latch 44 and is attached to one of the latch plates of the rear latch 44 at its inner end. The handle has a transverse hand grip portion 60 at the outer end.

Rollers 66 and 68 are rotatably mounted on the latch plates of each of the latches 42, 44 by pivot pins 70. Rollers 66, 68 of each latch have aligned axes. When the latches are retracted as in FIG. 3, the rollers are lowered to positions in which they are capable of rolling on the escutcheons 226, 228 so that the seat may be moved easily along the escutcheons during installation and removal. When the latches are in their latching position as in FIG. 2, the rollers are raised above and out of contact with the escutcheons.

An elongated locking pawl 74 extends lengthwise of the handle 54 and is guided for radial sliding movement along the length of the handle by a guide 78 (FIGS. 2, 3, 12, 13 and 14). The guide 78 includes a guide bar 80 secured to the handle and a guide strip 82 secured to the guide bar by fasteners 84. The guide strip 82 is spaced from the guide bar 80 to slidably receive the locking pawl 74. The fasteners 84 extend through slots 86 in the locking pawl, which slots are elongated to permit the locking pawl to slide.

A lock plate 90 (FIGS. 13, 14) is secured to the rear of the frame 40 by fasteners 92 and has two notches 94 and 96 separated by an arcuate peripheral edge 98. The lock plate 90 has a hole 99 registering with the hole 51 in the frame, of the same configuration. The locking pawl has a lock pin 100 at its radially inner end which is selectively engageable in one or the other of the notches 94, 96. When the lock pin 100 is engaged in the notch 96, the handle is in a position holding the rear latch 44 in its retracted position. When the locking pin 100 is in the notch 94, the handle is in a position holding the rear latch in its latching position.

A coil spring 104 (FIG. 12) is compressed between a transverse extension 106 of the outer end of the guide bar 80 and a transverse outer end portion 108 of the pawl 74. The spring 104 presses the pawl radially inwardly into contact with the peripheral edge 98 of the lock plate 90. The pawl can be retracted against the force of the spring by gripping the transverse hand grip portion 60 of the handle and squeezing the transverse outer end portion 108 of the pawl.

The bottom edge of the rear of the frame 40 and the bottom edge of the lock plate 90 have registering recesses 110. The bottom edge of the front of the frame has a recess 112. The recesses 110 and 112 are adapted to receive the strikers 32, 34 as will become more apparent from the following description.

Front and rear cinches 120 and 122 (FIGS. 7, 9, 11–15) are provided adjacent the front and rear latches 42, 44. The front cinch 120 includes a cinch plate 124 secured to the frame 40 by fasteners 126. A gripper 128 is secured to the cinch plate 124. The gripper 128 extends across the recess 112 slightly below the upper edge thereof to bear on the striker 32. The rear cinch 122 includes a cinch plate 130 secured to the frame 40 by the fasteners 92 in overlying relation to the lock plate 90. A gripper 132 is secured to the cinch plate 130. The gripper 132 extends across the recesses 110 slightly below the upper edge thereof to bear on the striker 34. FIGS. 13 and 14 show the relationship of the rear cinch plate 130 and gripper 132 to the recess 110. The same relationship exists between the front cinch plate 124 and gripper 128 to the recess 112. FIG. 9 shows the gripper 128 bearing upon the striker 32.

The cinch plate 124 has a hole 140 which registers with the hole 49 in the frame, of the same hat-shaped configuration. The cinch plate 130 has a hole 142 which registers with the hole 51 in the frame and the hole 99 in the lock plate 90, of the same hat-shaped configuration (see FIG. 15).

The holes 49 and 140 in the frame 40 and in the cinch plate 124 have registering lower elongated downwardly dished portions 150. An elongated leaf spring 152 extends lengthwise within the registering dished portions 150 and is flat and straight in its normal unstressed condition shown in FIG. 13. The holes 51, 99 and 142 in the frame 40, in the lock plate 90 and in the cinch plate 130, have registering lower elongated downwardly dished portions 154. An elongated leaf spring 156 extends lengthwise within the registering dished portions 154 and is flat and straight in its normal unstressed condition such as shown in FIG. 13 in connection with leaf spring 156. The springs 152 and 156 bear upwardly on the pivot pins 46 and 47 and hence on the latches 42 and 44.

A flag 160 (FIGS. 12 and 15) is provided to indicate when the riser 38 is latched to the rear striker 34 and when it is not. The flag 160 is an elongated element slidable within the handle 54, having a cap 162 on the outer end adapted to project through an opening 164 in the outer end of the handle. The flag 160 is connected to the pawl 74 by the pin 100. When the pawl 74 is engaged in the notch 94 of the lock plate 90, the outer end of the flag is flush with the outer end of the handle without projecting outwardly beyond the opening 164 exposing cap 162 and part of flag 160 therein, as shown in FIG. 12. This indicates that the rear latch 44 is in its latching position latched to the striker 34. When the pawl 74 engages the arcuate portion 98 of the lock plate, and even when it engages the notch 96 therein, the flag 160 projects outwardly beyond the outer end of the handle to indicate that the riser is not latched to the striker. The notch 96 is shallower than the notch 94 so that even when the pin 100 on the pawl is in the notch 96 the flag still projects somewhat beyond the outer end of the handle, although not to the extent that it projects beyond the outer end of the handle when the pin is in engagement with the arcuate portion 98. The cap 162 and/or top portion of 160 may be painted a bright color to be more readily observed.

In operation, when the latches 42 and 44 move to the latching position shown in FIGS. 2 and 14, the hooks 52 of the latches engage the undersides of the strikers 32 and 34 and the grippers 128 and 132 engage the upper sides of the strikers to firmly and positively latch the risers to the strikers and prevent any looseness or rattling or squeaks or shifting of the seat. During this movement of the latches to the latching position, the somewhat loose connection between the oversized semi-circular portions 48 of the holes 49 and 51 in the riser frame 40 and the pivot pins 46 and 47 permits the latches to be pulled upward by the leaf springs 152 and 156 as the latch hooks engage the undersides of the strikers to increase the frictional grip of the grippers 128 and 132 on the upper sides of the strikers. During this relative upward movement of the latches relative to the riser frame and the cinch plates, the leaf springs 152 and 156 flex downwardly to the condition shown in FIG. 14. The leaf springs allow the latch hooks 52 to cam under the strikers 32, 34 and then the resilient yielding action of the springs presses the latches upwardly and holds the hooks under pressure in firm engagement with the strikers.

What is claimed is:

1. A seat riser for use with a motor vehicle of the type having longitudinally spaced and laterally extending front and rear floor mounted strikers to removably mount a seat in the vehicle, said riser comprising;

a frame, a front latch having a front hook, a rear latch having a rear hook, a front pivot pin mounting said front latch on said frame for pivotal movement between a retracted position and a latching position in which the hook of said front latch engages an underside of said front striker, a rear pivot pin mounting said rear latch on said frame for pivotal movement between a retracted position and a latching position in which the hook of said rear latch engages an underside of said rear striker, front and rear cinches mounted on said respective front and rear latches adapted to bear on an upper side of the associated striker when said latches are in their latching positions to cooperate with said hooks in stabilizing and anchoring said riser, and means for pivoting said latches between their retracted and latching positions, wherein said front and rear pivot pins are mounted respectively in oversized front and rear holes in said frame permitting movement of said latches toward and away from the cinches, said holes having lateral extensions providing each of said holes with a hat-shaped configuration, and front and rear leaf springs in the lateral extensions of the respective front and rear holes, said leaf springs bearing on the respective front and rear pivot pins to urge said latches toward said cinches.

2. A seat riser according to claim 1, wherein said means for pivoting said latches comprises a handle connected to one of said latches, and a link interconnecting said latches wherein the relationship of said latches to one another and to said link is such that when said latches are pivoted to their latching positions, one of said latches engages the associated striker before the other, and when said latches are pivoted away from their latching positions, one of said latches disengages the associated striker before the other, thereby reducing the maximum force needed to pivot said latches to and from their latching positions.

3. A seat riser according to claim 2, wherein each of said cinches comprises a cinch plate and a gripper element mounted thereon adapted to frictionally engage the associated striker when said latches are in their latching positions.

4. A seat riser for use with a motor vehicle of the type having longitudinally spaced and laterally extending front and rear floor mounted strikers to removably mount a seat in the vehicle, said riser comprising;

a frame, a front latch having a front hook, a rear latch having a rear hook, a front pivot pin mounting said front latch on said frame for pivotal movement between a retracted position and a latching position in which the hook of said front latch engages an underside of said front striker, a rear pivot pin mounting said rear latch on said frame for pivotal movement between a retracted position and a latching position in which the hook of said rear latch engages an underside of said rear striker, front and rear cinches mounted on said respective front and rear latches adapted to bear on an upper side of the associated striker when said latches are in their latching positions to cooperate with said hooks in stabilizing and anchoring said riser, and means for pivoting said latches between their retracted and latching positions, wherein said means for pivoting said latches comprises a handle connected to one of said latches, and a link interconnecting said latches, wherein the relationship of said latches to one another and to said link is such that when said latches are pivoted to their latching positions, one of said latches engages the associated striker before the other, and when said latches are pivoted away from their latching positions, one of said latches disengages the associated striker before the other, thereby reducing the maximum force needed to pivot said latches to and from their latching positions.

5. A seat riser according to claim 4, wherein each of said cinches comprises a cinch plate and a gripper element mounted thereon adapted to frictionally engage the associated striker when said latches are in their latching positions.

* * * * *